Sept. 21, 1965 R. B. BELKIN 3,207,610
METHOD FOR INDIVIDUALLY PACKAGING
READY-TO-SQUEEZE CITRUS FRUIT
Filed April 30, 1963 2 Sheets-Sheet 1
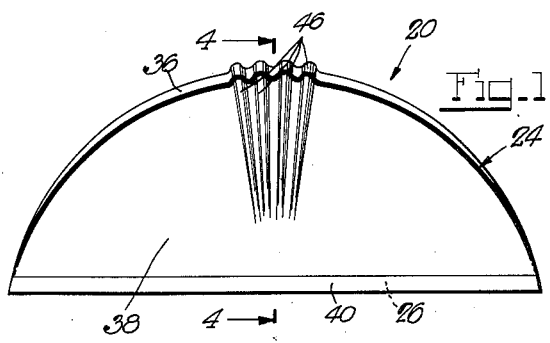
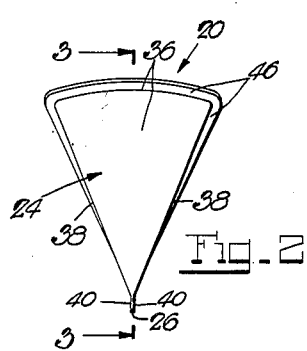
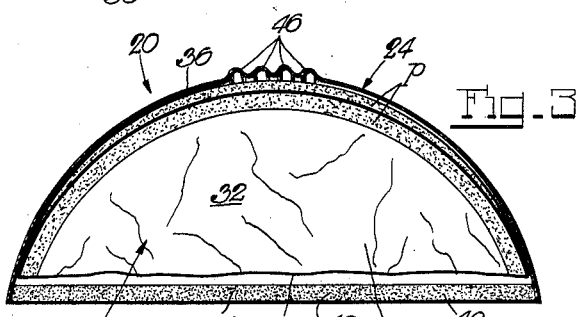
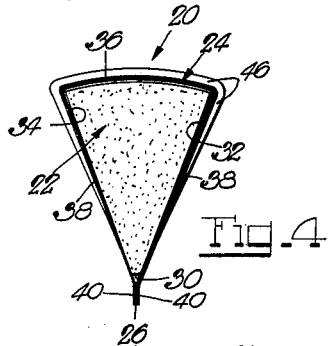
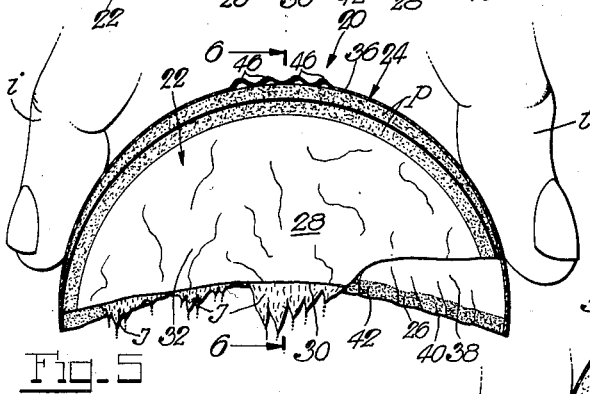
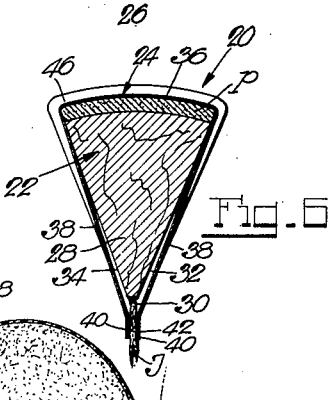
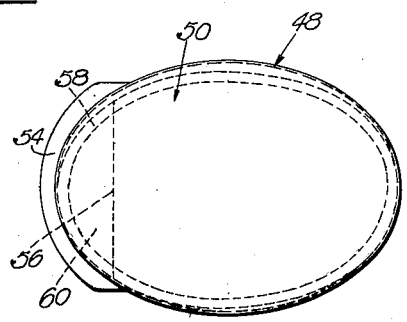
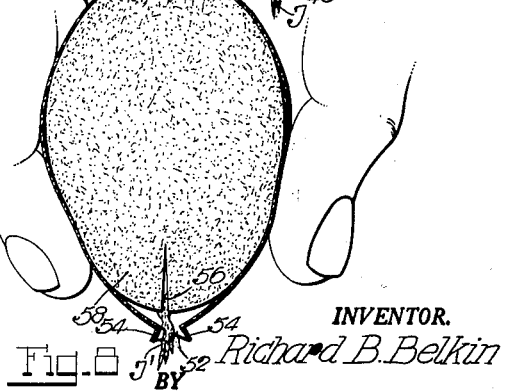
INVENTOR.
Richard B. Belkin

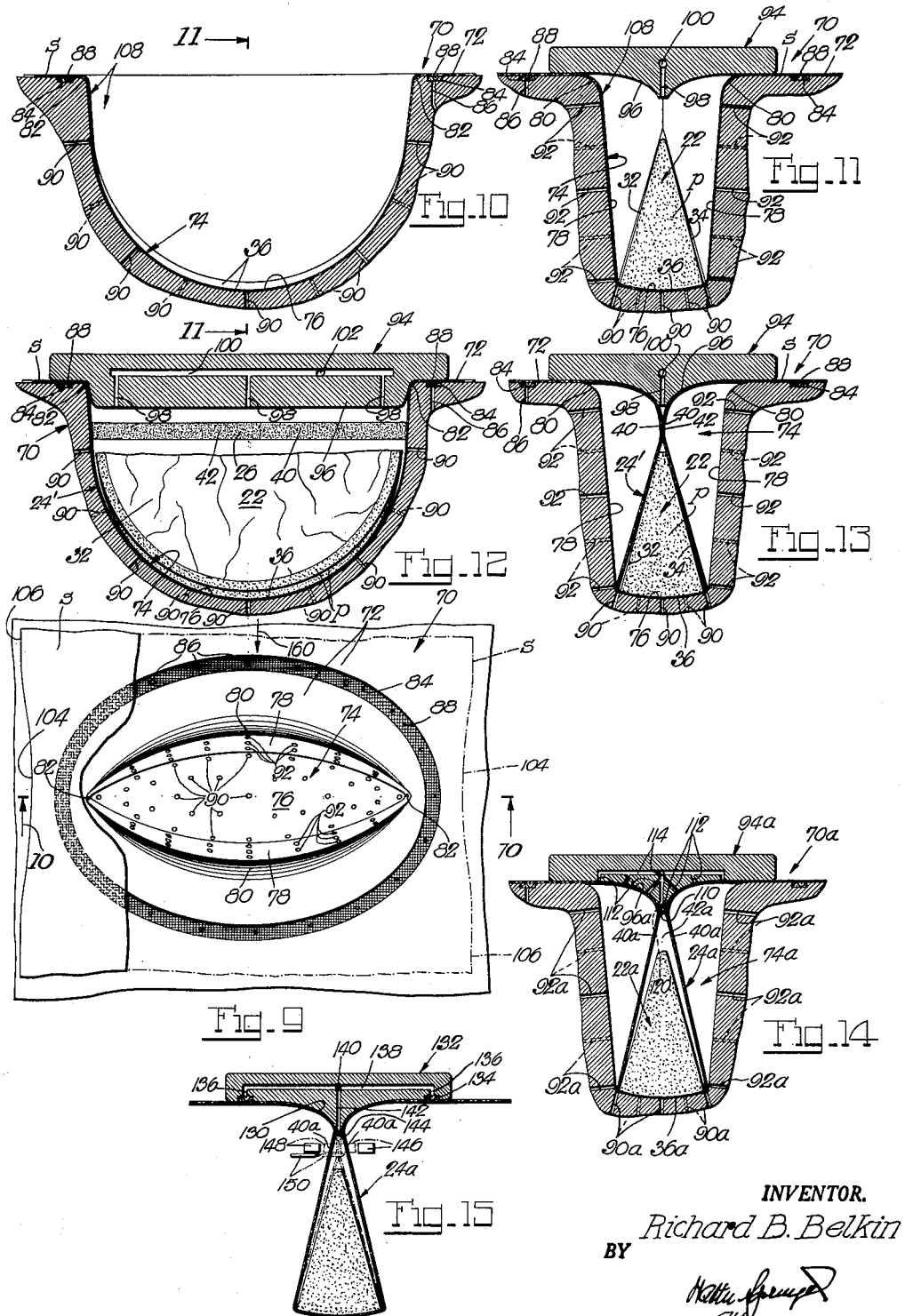

United States Patent Office 3,207,610
Patented Sept. 21, 1965

3,207,610
METHOD FOR INDIVIDUALLY PACKAGING
READY-TO-SQUEEZE CITRUS FRUIT
Richard B. Belkin, 4074 River Road, Niskayuna, N.Y.
Filed Apr. 30, 1963, Ser. No. 276,800
4 Claims. (Cl. 99—171)

This invention relates to individually packed fruit in general, and to individually packed ready-to-squeeze citrus or the like fruit in particular.

It is an object of the present invention to provide individually packed citrus or the like fruit in ready-to-squeeze state, so that the consumer may extract its juice on merely squeezing the packed fruit in the manner accustomed for that purpose, thereby avoiding not only spoilage of a quantity of fruit from one or more rotten ones among them, but also all contact between a fruit and the hands serving and squeezing it in the best sanitary manner and with the least messiness.

It is another object of the present invention to provide individually packed citrus or the like fruit in ready-to-squeeze state, the wrapper of which is of flexible material, preferably plastic, and is also sealed so that on squeezing the packed fruit for juice extraction the seal will open and serve as the discharge spout for the juice, with the seal on the wrapper even permitting vacuum-packing of the fruit and in any event keeping the fruit out of contact with decay-inducing matter outside the wrapper for optimum preservation of the fruit's purity.

A further object of the present invention is to provide individually packed citrus or the like fruit in read-to-squeeze state, of which the material of the wrapper is rather tear-resistant so as not to break on even the most forceful squeezing of the contained fruit, with the aforementioned seal of the wrapper being sufficiently weak to open on squeezing the packed fruit for juice extraction.

Another object of the present invention is to provide individually packed citrus or the like fruit in ready-to-squeeze state, the wrapper of which is designed for its simplest and least expensive formation by molding for its intended disposal with the fruit it contains, thereby keeping the cost of the packed fruit no more than inappreciably higher than if the same were not packed.

It is another object of the present invention to provide individually packed citrus or the like fruit in ready-to-squeeze state, the molded wrapper of which is transparent, thereby to afford at a single glance an indication of the contained fruit's quality and condition and permit disposal of any fruit that may be in any stage of decay preferably before it could reach the consumer.

It is a further object of the present invention to provide individually packed citrus or the like fruit whole or in single slice form, with the packed fruit in either form being in its aforementioned ready-to-serve state incised through the peel thereof to bare its pulpy meat for the extraction of the juice thereat, with the seal on the molded wrapper being oriented alongside the contained fruit's bared meat for direct discharge of the juice through the broken seal when the packed fruit is squeezed.

Another object of the present invention is to provide individually packed citrus or the like fruit in single slice form preferably as wedges sliced in the manner of orange wedges, for example, which in this wedge form are with the least effort and manipulation squeezed for optimum extraction of the juice therefrom, with the molded wrapper being preferably shaped in rather close conformity with the contained fruit wedge to permit squeezing of the latter with the same ease as if it had no wrapper, and the seal of the wrapper being alongside the edge of the contained fruit wedge on which its tapering sides converge so as to be in the direct path of the juice being extracted on habitually squeezing the wedge lengthwise between the fingers until more or less squashed.

It is another object of the present invention to provide individually packed citrus or the like fruit in single wedge form, of which the aforementioned conforming molded wrapper has midway of its length deformations which on the one hand stiffen the wrapper against accidental opening of its seal in the various handling of the packed fruit wedge prior to its juice extraction, and on the other hand act as a hinge or hinges which on correct squeezing of the fruit wedge for juice extraction largely eliminate stiffness of the wrapper opposed to such squeezing so that the fruit wedge may thus be squeezed with the same ease as if it had no wrapper.

It is a further object of the present invention to devise a method according to which citrus or the like fruit is individually packed efficiently and at exceedingly low cost.

Another object of the present invention is to devise a method of individually packing citrus or the like fruit, which features formation of the individual wrappers by stretch-molding plastic sheet, with the fruit being placed into the partially formed wrappers and enclosed therein on the finish-formation of the latter.

Other objects and advantages will appear to those skilled in the art from the following, considered in conjunction with the accompanying drawings.

In the accompanying drawings, in which certain modes of carrying out the present invention are shown for illustrative purposes:

FIGS. 1 and 2 are side and end views, respectively, of packed fruit embodying the present invention;

FIGS. 3 and 4 are sections taken substantially on the lines 3—3 and 4—4, respectively, of FIGS. 2 and 1;

FIG. 5 is a longitudinal section through the packed fruit in process of being squeezed for juice extraction;

FIG. 6 is a section taken substantially on the line 6—6 of FIG. 5;

FIG. 7 is a view of a packed fruit embodying the present invention in a modified manner;

FIG. 8 is a section through the packed fruit of FIG. 7 in the process of being squeezed for juice extraction;

FIG. 9 is a fragmentary top view of a mold in which fruit is packed according to a featured method that is part of the present invention;

FIGS. 10 and 11 are sections through the mold taken on the lines 10—10 and 11—11, respectively, of FIGS. 9 and 10, and demonstrating successive steps in the featured method of packing fruit;

FIGS. 12 and 13 are sections through the mold similar to FIGS. 10 and 11, respectively, and demonstrating still another step in the featured method of packing fruit;

FIG. 14 is a section through a modified mold, demonstrating a step in a modified method of packing fruit; and FIG. 15 is a section through part of modified mold equipment, demonstrating a step in a further modified method of packing fruit.

Referring to the drawings, and more particularly to FIGS. 1 to 6 thereof, the reference numeral 20 designates an individually packed ready-to-squeeze citrus or the like fruit which, in the present instance, is a slice 22, and preferably a wedge, from a whole fruit, such as a lemon, for example, which is packed in a wrapper 24 that substantially conforms in size and shape to the contained fruit wedge and is preferably sealed at 26. The fruit slice 22 in the preferred wedge form is best suited for extracting its juice with the least effort and finger manipulation by squeezing the wedge preferably in the accustomed manner at or near its ends with the thumb and index finger $t$ and $i$ (FIG. 5) until the same is more or less squashed, whereby the juice $j$ runs from the bared flesh part 28 of the fruit wedge primarily at its edge 30 on which its tapering sides 32 and 34 converge. It is a preferred feature of the packed fruit 20 that the seal 26 of its wrapper 24 extends along the edge 30 of the contained fruit wedge 22 and breaks open the moment the packed wedge is squeezed for juice extraction (FIG. 5). In this manner, spoilage of a quantity of sealed packed fruit from one or more rotten ones among them is avoided, and there is also avoided all contact between a packed fruit and the hands serving and squeezing it in the best sanitary manner and with the least messiness, yet the seal will break of its own accord when starting to squeeze the packed fruit for juice extraction and will even serve as a discharge spout for the extracted juice (FIGS. 5 and 6).

The wrapper 24, which is preferably molded in a single piece as hereinafter described, is of flexible tear-resistant material, preferably thermoplastic, and has a bottom panel 36 substantially conforming to the part-spherical, more or less, peel $p$ of the contained fruit wedge 22, and opposite side panels 38 which conform more or less to the tapering sides 32 and 34 of the fruit wedge and extend therebeyond to form along the edge 30 of the fruit wedge opposite lips 40 of an opening 42 in the wrapper (FIGS. 5 and 6) which is closed and sealed at 26 (FIGS. 3 and 4). The seal 26 between the lips 40 of the wrapper 24 is effected preferably by the wrapper material itself by heat-sealing the lips at their opposing faces or applying a suitable solvent thereto and pressing them together momentarily, with the strength of the seal being preferably such that it will withstand ordinary handling of the packed fruit wedge, but will break on starting to squeeze the latter for juice extraction as described earlier.

With the wrapper 24 being sealed, the contained fruit wedge is in any event kept out of contact with decay-inducing matter outside the wrapper for optimum preservation of the fruit's purity, and the seal on the wrapper even permits vacuum-packing of the fruit wedge for its storage under vacuum until its juice is extracted. Also, and as already mentioned, the wrapper material is rather tear-resistant so as not to break on even the most forceful or awkward squeezing of the packed fruit wedge, save at its seal as intended. Further, the wrapper is designed and made for disposal with the fruit wedge it contains, with the cost of the packed fruit wedge being no more than inappreciably higher than if the same were not packed. Moreover, the wrapper 24 is preferably of transparent plastic, thereby to afford at a single glance an indication of the contained fruit wedges equality and condition and permit disposal of any packed fruit wedge that may be in any state of decay, preferably before it is served. Also, while the packed fruit wedge is intended primarily for extraction of its juice and then disposal of the rest, as in the case of lemon or lime wedges, for example, the wrapper does not preclude squeezing some or most of the pulpy flesh from a contained fruit wedge for consumption of the same, as in the case of a packed orange wedge, for example.

Being molded, the wrapper 24 is preferably sufficiently rigid to self-maintain its shape in the absence of external squeezing forces thereon. If desired, the wrapper 24 may be formed midway of its length on either or all of its panels 36 and 38 with a transverse corrugation or corrugations 46 which on the one hand stiffen the wrapper against accidental opening of its seal in the various handling of the packed fruit wedge prior to its juice extraction, and on the other hand act as a hinge or hinges which on the contemplated squeezing of the fruit wedge for juice extraction largely eliminate stiffness of the wrapper opposed to such squeezing so that the fruit wedge may thus be squeezed with the same ease as if it had no wrapper.

While the individually packed citrus or the like fruit of FIGS. 1 to 6 is in the form of a fruit wedge, it may obviously be in any other form of slice from a whole fruit, or may even be a whole fruit. Thus, FIGS. 7 and 8 shown an individually wrapped whole fruit 48, such as a lime, for example, the wrapper 50 of which may, like the wrapper 24 of the packed fruit wedge 20, be molded from plastic sheet in substantial conformity in size and shape to the contained fruit, and have over part of its circumference a normally sealed opening 52 formed by opposite lips 54 which, on squeezing the packed fruit for juice extraction in a manner like or similar to that shown in FIG. 8 and ensuing breakage of the seal, gap apart and form a discharge spout for the extracted juice $j'$. In order to have the packed lime 48 in ready-to-squeeze condition, the same, like the packed fruit wedge of FIGS. 1 to 6, has part of its juice-containing flesh bared. This is done by at least one incision 56 through the outer peel 58 of the lime into the flesh 60 thereof to a depth like or similar to that indicated in FIGS. 7 and 8. The initially sealed openig 52 is preferably arranged alongside the incision 56 in the contained lime 48 so as to be in the direct path of the juice being extracted on squeezing the packed lime for that purpose with ensuing breaking of the seal and spout formation of the opening 52 (FIG. 8).

Reference is now had to FIGS. 9 to 13, showing apparatus for individually packing citrus or the like fruit, in this instance the fruit wedges 22 of FIGS. 1 to 6, in accordance with a featured method of the present invention, involving the preparation of a single piece of fruit with juice-containing flesh thereof bared in ready-to-squeeze fashion, molding thermoplastic stock in plasticized state into an initial open wrapper for reception of the fruit piece, placing the fruit piece into the initial wrapper through the opening thereof, and stretch-molding the initial wrapper substantially to the size and shape of the contained fruit piece with the initial opening contracted into an elongated slot. In the method of individually packing exemplary fruit wedges as shown in FIGS. 10 to 13, the fruit is prepared by slicing wedges 22 from a whole fruit. The apparatus involved in packing the individual fruit wedges includes a mold 70 having a top surface 72 and a cavity 74 therein. The mold cavity 74 has a bottom surface 76 and opposite side surfaces 78, of which the bottom surface 76 substantially conforms in size and shape to the outer peels $p$ of the prepared fruit wedges 22, while the side surfaces 78 preferably taper apart from the opposite sides of the bottom surface 76 to the top surface 72 and merge into the latter in the smoothly rounded fashion indicated at 80 and 82 in FIGS. 9 to 11. Provided in the top surface 72 of the mold 70 in surrounding relation with the mold cavity 74 is an endless groove 84 which through a plurality of ducts 86 is in communication with a vacuum source through intermediation of a suitable valve (not shown) which may be actuated to connect the ducts with the partial vacuum source or with the atmosphere. As shown in FIG. 9, the groove 84 is symmetric with the mold cavity 74 and is preferably in the form of an ellipse, and the same preferably receives an air-permeable screen 88. Provided in the bottom surface 76 and side surfaces 78 of the mold cavity are series of ducts 90 and 92, respectively, of which the ducts of each series may through a separate valve (not shown) be connected with a vacuum source or with the atmosphere. The mold further includes a removable cover member 94 having a ridge formation 96 projectable into the mold cavity 74 and provided with a plurality of ducts 98 (FIGS. 11 and 12) which through connecting ducts 100 and 102 and a control valve (not shown) may be connected either with a vacuum source or the atmosphere.

In operation of the mold 70, a sheet $s$ of any suitable thermoplastic just extruded is placed on the top surface 72 of the open mold to cover the mold cavity 74 and extend beyond the screen-lined groove 84 in the top surface 72, with the plastic sheet being preferably permitted to droop into the mold cavity 74 to some extent as indicated in FIG. 9 by the inwardly curved lengths 104 of the side edges 106 of the plastic sheet on the opposite ends of the mold cavity. A partial vacuum is then applied through the ducts 86 to the groove 84 in the mold surface 72, with the result that the part of the plastic sheet overlying the groove 84 is drawn against and firmly held to the screen liner 88 therein. Immediately thereafter, a partial vacuum is applied, preferably first to the ducts 90 in the bottom surface 76 and then to the ducts 92 in the side surfaces 78 of the mold cavity 74, with the result that the part of the plastic sheet *s* inside the margin thereof held against the screen liner 88 in the groove 84 is drawn into the mold cavity and thereby stretched into exact conformity with the bottom and side surfaces 76 and 78 thereof as shown in FIG. 10, and as also shown in FIG. 11 except that at this stage the cover member 94 is removed from the mold. The plastic sheet *s* is at this initial stage of its formation in the form of an initial wrapper 108 which is open at the top and conforms to the size and shape of a prepared fruit wedge only with its bottom panel 36 on the bottom surface 76 of the mold cavity 74. Next, a fruit wedge 22 is dropped into the initial wrapper 108 through the open top thereof, with the outer peel *p* of the inserted fruit wedge resting and being located on the bottom panel 36 of the initial wrapper, whereupon the cover member 94 is closed on the mold and, inconsequence, comes to rest on the plastic sheet *s* on the top surface 72 of the mold to seal the interior of the initial wrapper 108 from the atmosphere outside the mold cavity. Immediately thereafter, and while the groove 84 and ducts 90 are maintained under partial vacuum, the ducts 92 in the side surfaces 78 of the mold cavity are connected with the atmosphere, and simultaneously therewith or immediately thereafter the ducts 98 in the cover member 94 are connected to their partial vacuum source, with the result that all but the bottom panel 36 of the initial wrapper 108 in still plasticized state is drawn and stretched into conformity with the tapering sides 32 and 34 of the contained fruit wedge 22 and with the ridge formation 96 on the cover member 94 in the manner shown in FIGS. 12 and 13, thereby finishing the formation of the wrapper. In thus evacuating the air from the initial wrapper 108 and stretching the same into its final shape (FIG. 13) under the compulsion of the then atmospheric, or near atmospheric, air pressure in the mold cavity outside the wrapper, the contained fruit wedge is vacuumatically packed and the opening 42 of the wrapper is also closed and sealed by contact of the opposite lip formations 40 thereof. It is the relatively light pressure contact in this fashion between the lip formations 40 of the wrapper which leaves the ensuing seal 26 thereat sufficiently strong to keep the wrapper hermetically sealed, yet sufficiently weak that it will break on subsequent squeezing of the packaged fruit wedge for juice extraction, as described earlier. The wrapper thus finish-formed is removed from the mold after first connecting the ducts 90 with the atmosphere, whereby the wrapper may be removed from the mold with the cover member 94 while the ducts 98 of the latter are still connected to their vacuum source, with the wrapper being subsequently separated from the cover member on connecting its ducts with the atmosphere. The final operation on the wrapper thus finish-formed is a trimming operation to separate the wrapper proper 24' and contained fruit wedge from the remainder of the initial plastic sheet along the sealed lips 40 of the wrapper. The wrapper proper 24' is thus like the wrapper 24 of FIGS. 1 to 6, except that it lacks the corrugations 46 of the wrapper 24 which, however, could be provided on the wrapper 24' by forming the corrugations in the bottom surface 76 of the mold cavity 74, as will be readily understood.

It is obvious that the described stretch-molding of the wrapper around the fruit wedge involves subjection of the latter to heat which, however, is neither detrimental to the fruit wedge nor objectionable on other grounds, provided the molding cycle is very brief and the stretched plastic stock is quite thin, say a few mils, all of which can be achieved on accurate control of the molding operation. Thus, the longest contact, in point of time, between the fruit wedge and the plastic stock in the formation of the wrapper is between the bottom panel 36 of the wrapper and the outer peel *p* of the fruit wedge 22 (FIG. 11) which obviously has no adverse effect on the juice-containing bared flesh of the fruit wedge. On the other hand, the remaining plastic stock of the initial sheet which partakes in the finish-formation of the wrapper (FIG. 13) may be stretched while it is near the borderline of its plasticity for that purpose and also for forming the seal 26 in the described manner, and with this remaining plastic stock being thus stretched very thin, the same will start to set almost immediately on contact with the bared flesh of the contained fruit wedge and thus have no adverse effect on the latter. To further expedite cooling of the wrapper in its finish-formation without interfering with its quick stretch to that end, it is also feasible to connect the ducts 92 in the side surfaces 78 of the mold cavity 74 with chilled air under atmospheric or even higher pressure in the described molding cycle.

Reference is now had to FIG. 14 which shows a mold 70a that may in all respects be like the described mold 70 of FIGS. 9 to 13, except that the cover member 94a is different for molding a modified wrapper 24a. This modified wrapper 24a may in all respects be like the wrapper 24' of FIGS. 12 and 13, except that the opening 42a at its lips 40a is neither closed nor sealed. Packing an exemplary fruit wedge 22a in this fashion in the open wrapper 24a is not only fully within the purview of the present invention, but secures all the advantages of the described individually packed and sealed fruit, save its sealing advantages in point of vacuumatic packing of the same and its isolation from possible decay-inducing matter outside the wrapper. However, these sealing advantages may be dispensed with in cases where the fruit is consumed soon after its packing.

The formation of the modified wrapper 24a in the mold 70a (FIG. 14) is identical with the described formation of the wrapper 24' into its initial form shown in FIGS. 10 and 11, and including the deposit of the fruit wedge therein. It is at this point where the cover member 94a is placed over the initially formed wrapper in the mold cavity 74a. The cover member 94a has in its ridge formation 96a, except at its top 110, a multiplicity of ducts 112 which through further ducts 114 are connectible by a control valve (not shown) either with a vacuum source or with the atmosphere. On thus placing the cover member 94a over the initially formed wrapper in the mold cavity 74a, the ducts 92a in the mold cavity 74a are connected with the atmosphere and simultaneously therewith or immediately thereafter the ducts 112 in the cover member are connected with their vacuum source, while the ducts 90a in the mold cavity 74a remain connected with their vacuum source. As a result, the initial wrapper, save its bottom panel 36a, is drawn and stretched into a configuration like or similar to that shown in FIG. 14 in which the same conforms to the ridge formation 96a on the cover member 94a and extends along, but is entirely, or at least mostly, out of contact with, the bared flesh of the contained fruit wedge on its tapering sides, as will be readily understood. Also, in thus finish-forming the wrapper 24a, the wide top opening of the initial wrapper is contracted into a relatively narrow open slot 42a defined by the closely spaced lip formations 40a. Here, as in the case of the formation of the finished wrapper 24' in FIG. 13, the ducts 92a in the mold cavity 74a, rather than being connected with the atmosphere as described above, may instead be connected with a source of chilled air at atmospheric or even higher pressure to expedite setting of the finished wrapper 24a sufficiently for its removal with the contained fruit wedge from the mold. On removal of the finished wrapper 24a from the mold 70a and cover member 94a, the same is trimmed at its open lips 40a to separate it from the rest of the initial plastic sheet.

To further expedite chilling and setting of the finished wrapper 24a, the cover member 94a may in its top 110 be provided with a plurality of ducts 120 which through a valve (not shown) may be connected with or disconnected from a source of chilled air slightly above atmospheric pressure. Thus, substantially at the instant of finish-formation of the wrapper 24a (FIG. 14), chilled air may be admitted to the ducts 120 to chill the interior of the wrapper almost instantaneously to the point where the latter becomes sufficiently set to retain its shape, with gapping of the wrapper away from the ridge formation 96a on the cover member 94a in consequence of the admission of the chilled air at its specified pressure being rather small and inconsequential owing to the rapid setting of the wrapper.

The advantageous finish-formation of the wrapper 24a out of contact with the bared flesh of the contained fruit wedge as shown in FIG. 14, may also be carried further to vacuum-packing the same fruit wedge and sealing its wrapper. To that end, the finished wrapper 24a with the contained fruit wedge is, on its removal from the mold 70a and cover member 94a and before trimming at its lips 40a (FIG. 15), held against the ridge formation 130 of a member 132 by a partial vacuum acting on the wrapper at a preferably screen-lined endless groove 134 in the ridge formation which through ducts 136, 138, 140 and a control valve (not shown) is connectible with a vacuum source or with the atmosphere. Simultaneously therewith, the interior of the wrapper 24a has most of its air evacuated through several ducts 142 in the top 144 of the ridge formation 130 which are in communication with the vacuum duct 140, resulting in contraction of the wrapper into conformity with the tapering sides of the contained fruit wedge and substantial contact of its lip formations 40a. It is then that opposite, temporarily heated pressure fingers 146 and 148 close on the lip formations 40a and locally heat and press them together sufficiently to heat-seal them to the required extent, while a knife blade 150 is moved to trim the wrapper. The pressure fingers 146 and 148 being then momentarily chilled in any suitable manner, are retracted from the sealed lips 40a for the removal of the finally packed fruit wedge.

For efficient and continuous packing of individual fruit according to any of the described methods, it is contemplated to follow the known procedure of continuously extruding a thermoplastic sheet or band s in the direction of the arrow 160 in FIG. 6 to a station at which the mold is located and the molding operation performed on successive lengths of the plastic sheet, with the plastic sheet thus molded intermittently into successive individually packed fruit being suitably conveyed away from this station to another station at which the described trimming takes place. This procedure is also feasible in pursuing the modified method described in connection with FIG. 15, by arranging the member 132, pressure fingers 146, 148 and knife blade 150 at a last station to which the continuous plastic sheet is conveyed.

While the several fruit-packing methods described were concerned with exemplary fruit wedges, these same methods are obviously applicable to packing individual fruit slices other than wedges or whole fruit as shown in FIG. 8.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. A method of individually packing citrus fruit, which comprises preparing a fruit piece with juice-containing flesh thereof bared in ready-to-squeeze fashion; stretch-molding a plasticized thermoplastic sheet into an initial open wrapper for reception of the fruit piece, by drawing by a vacuum a central part of the sheet into an open-end mold cavity; placing the fruit piece with said bared flesh upwardly into said wrapper through the opening thereof; and stretch-molding the wrapper in the mold cavity around and substantially to the size and shape of the contained fruit piece with the wrapper opening contracted into an elongated slot, by drawing by a vacuum part of the sheet of the wrapper against a temporarily cavity-closing mold surface.

2. The method set forth in claim 1, which further comprises closing and sealing the slot of the stretch-molded wrapper.

3. The method set forth in claim 1, which further comprises evacuating air from said stretch-molded wrapper by subjecting its interior to a vacuum through said slot; and while the interior of said stretch-molded wrapper is still subjected to the vacuum, closing and sealing the slot in the wrapper to maintain the contained fruit piece under vacuum.

4. A method of individually packing sliced wedges of citrus fruit, which comprises stretch-molding a plasticized thermoplastic sheet into an initial open-top wrapper with its bottom substantially conforming to the outer periphery of a fruit wedge, by drawing by a vacuum a central part of the sheet into an open-end mold cavity; placing a fruit wedge into said wrapper through the top opening thereof with the outer periphery of said first wedge resting on said wrapper bottom; stretch-molding in the mold cavity the wrapper, except said bottom thereof, around and substantially to the size and shape of the remainder of the contained fruit wedge with the initial opening contracted into a slot alongside the edge of the contained fruit wedge on which its tapering sides converge, by drawing by a vacuum part of the sheet of the wrapper against a temporarily cavity-closing mold surface; evacuating air from said stretch-molded wrapper by subjecting its interior to a vacuum through said slot; and while the interior of the wrapper is still subjected to the vacuum, closing and sealing the slot in the wrapper to maintain the contained fruit wedge under vacuum.

References Cited by the Examiner

UNITED STATES PATENTS

| | | | |
|---|---|---|---|
| 1,836,062 | 12/31 | Biegeleisen | 100—211 |
| 2,688,914 | 9/54 | Eckler | 100—211 |
| 2,781,720 | 2/57 | Jefferson | 100—211 |
| 2,888,787 | 6/59 | Cloud | 53—22 |
| 2,934,867 | 5/60 | Vogt | 53—50 |

A. LOUIS MONACELL, *Primary Examiner.*

RAYMOND N. JONES, *Examiner.*